(12) United States Patent
Lee et al.

(10) Patent No.: US 9,685,116 B2
(45) Date of Patent: Jun. 20, 2017

(54) DISPLAY DEVICE USING A DEMULTIPLEXER CIRCUIT

(71) Applicant: LG Display Co., Ltd., Seoul (KR)

(72) Inventors: Jungmin Lee, Gyeonngi-do (KR); Changheon Kang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 337 days.

(21) Appl. No.: 14/446,555

(22) Filed: Jul. 30, 2014

(65) Prior Publication Data

US 2015/0035734 A1 Feb. 5, 2015

(30) Foreign Application Priority Data

Jul. 31, 2013 (KR) .................. 10-2013-0091060

(51) Int. Cl.
*G09G 5/10* (2006.01)
*G09G 3/3258* (2016.01)
(Continued)

(52) U.S. Cl.
CPC ......... *G09G 3/3258* (2013.01); *G09G 3/3291* (2013.01); *H04J 3/047* (2013.01); *H04Q 11/04* (2013.01); *G09G 2300/0852* (2013.01); *G09G 2300/0861* (2013.01); *G09G 2300/0876* (2013.01); *G09G 2310/0216* (2013.01); *G09G 2310/0289* (2013.01); *G09G 2310/0297* (2013.01); *G09G 2310/06* (2013.01);
(Continued)

(58) Field of Classification Search
CPC ...... G09G 3/32598; H04J 3/047; H04Q 11/04
USPC .................................................. 345/76, 690
See application file for complete search history.

(56) References Cited

U.S. PATENT DOCUMENTS

2004/0046725 A1* 3/2004 Lee ..................... G09G 3/3607
345/88
2005/0281127 A1 12/2005 Okuno et al.
(Continued)

FOREIGN PATENT DOCUMENTS

GB 2510481 A 8/2014
JP 2008233454 A 10/2008

OTHER PUBLICATIONS

Communication dated Nov. 28, 2015 from European Patent Office in counterpart EP Application No. 14179248.1.
(Continued)

*Primary Examiner* — Calvin C Ma
(74) *Attorney, Agent, or Firm* — Morgan, Lewis & Bockius LLP

(57) ABSTRACT

A display device is disclosed to include a display panel including a plurality of data lines, a plurality of gate lines, and a plurality of pixels coupled to the data lines and gate lines. The data lines include first and second data lines, and the pixels include first and second color pixels. The display device also includes a data driving circuit to generate data voltages through a plurality of output channels, a gate driving circuit coupled to the gate lines, and a timing controller to generate control signals to the data driving circuit and the gate driving circuit. The display device further includes a demultiplexer switching circuit with first demux switches to supply, when turned on, the data voltages from the output channels to the first data lines, and second demux switches to supply, when turned on, the data voltages from the output channels to the second data lines.

31 Claims, 19 Drawing Sheets

(51) Int. Cl.
*H04J 3/04* (2006.01)
*H04Q 11/04* (2006.01)
*G09G 3/3291* (2016.01)

(52) U.S. Cl.
CPC . *G09G 2310/08* (2013.01); *G09G 2320/0219* (2013.01); *G09G 2320/0233* (2013.01); *G09G 2320/0242* (2013.01); *G09G 2320/045* (2013.01)

(56) References Cited

U.S. PATENT DOCUMENTS

| | | | |
|---|---|---|---|
| 2006/0151745 A1 | 7/2006 | Kim et al. | |
| 2008/0111772 A1* | 5/2008 | Park | G09G 3/3291 345/76 |
| 2009/0251455 A1 | 10/2009 | Park et al. | |
| 2011/0164015 A1 | 7/2011 | Kim | |
| 2014/0098082 A1* | 4/2014 | Kwon | G09G 3/3291 345/212 |
| 2014/0184665 A1 | 7/2014 | Yoon et al. | |
| 2014/0333676 A1* | 11/2014 | Fujii | G09G 3/2003 345/690 |

OTHER PUBLICATIONS

Communication dated Jan. 28, 2015 from the European Patent Office in counterpart European patent application No. 14179248.1-1903 / 2833351.

* cited by examiner

DISPLAY DEVICE USING A DEMULTIPLEXER CIRCUIT

This application claims the benefit of Korea Patent Application No. 10-2013-0091060 filed in Korea on Jul. 31, 2013, the entire contents of which is incorporated herein by reference for all purposes as if fully set forth herein.

BACKGROUND OF THE INVENTION

Field of the Invention

The present invention relates to an active matrix display and, more particularly, to an active matrix organic light emitting display utilizing a demultiplexer to supply data voltages from data drivers to pixels.

Discussion of the Related Art

An active matrix organic light emitting display includes organic light emitting diodes (hereinafter, abbreviated to "OLEDs") capable of emitting light by itself, and has advantages, such as fast response time, high light emitting efficiency, high luminance, and wide viewing angle.

The OLED serving as a self-emitting element has a structure shown in FIG. 1. The OLED includes an anode electrode, a cathode electrode, and an organic compound layer formed between the anode electrode and the cathode electrode. The organic compound layer includes a hole injection layer HIL, a hole transport layer HTL, an emission layer EML, an electron transport layer ETL, and an electron injection layer EIL. When a driving voltage is applied between the anode electrode and the cathode electrode, holes passing through the hole transport layer HTL and electrons passing through the electron transport layer ETL move to the emission layer EML and form excitons. As a result, the emission layer EML generates visible light.

The organic light emitting display arranges pixels each including the OLED in a matrix form and adjusts a luminance of the pixels depending on the grayscale of input video data. Each pixel includes a driving thin film transistor (TFT) to control a driving current flowing in the OLED depending on a gate-source voltage of the driving TFT, a capacitor to hold a gate potential of the driving TFT constant during one frame, and a switching TFT to store a data voltage in the capacitor in response to a gate signal. The luminance of the pixel is proportional to a magnitude of the driving current flowing in the OLED.

The organic light emitting display includes a data driving circuit to convert digital video data into analog data voltages and supplies the analog data voltages to data lines of a display panel. Because the data driving circuit generally has as many output channels as the data lines of the display panel, the size of the data driving circuit increases as the number of data lines increases. This results in a higher cost of the data driving circuit. In a related art device, a demultiplexer (demux) driving method using a demux switching circuit was proposed to reduce the number of output channels of the data driving circuit by an order of 2 or more.

FIG. 2 shows a related art 1 to 2 demux driving method. A demux switching circuit shown in FIG. 2 connects output channels CH1, CH2, and CH3 of a data driving circuit with data lines D1 to D6 of a display panel, connecting each output channel to two of the data lines through switches S11, S12, S21, S22, S31, and S32. The demux switching circuit time-divides a data voltage input through one output channel and supplies the data voltage to the two data lines. A time-division operation of the demux switching circuit is performed by switching operations of demux switches S11, S21, S31, S12, S22, and S32 driven in response to demux control signals DMUX1 and DMUX2. The first demux switches S11, S21, and S31 are simultaneously turned on in response to the first demux control signal DMUX1, and the second demux switches S12, S22, and S32 are simultaneously turned on in response to the second demux control signal DMUX2. In this instance, the first demux switches S11, S21, and S31 and the second demux switches S12, S22, and S32 are turned on at different times.

When the demux switch connected to the pixel changes from a turn-on state to a turn-off state, a parasitic capacitor may reduce a voltage applied to the pixel by a kickback voltage. Thus, first pixels connected to the first demux switches S11, S21, and S31 and second pixels connected to the second demux switches S12, S22, and S32 may be affected by the kickback voltage. In this instance, because the first demux switches S11, S21, and S31 and the second demux switches S12, S22, and S32 are turned on at different times, the number of times the kickback voltage influences the first pixels may be different from the number of times the kickback voltage influences the second pixels. This difference results in an unwanted current deviation between the first pixels and the second pixels. FIG. 3 shows a current deviation between adjacent pixels resulting from a difference between the numbers of times the kickback voltage influences the adjacent pixels. The current deviation generates a longitudinal dim and thus reduces image quality.

Each of pixels displaying red (R) includes a red OLED, each of pixels displaying green (G) includes a green OLED, and each of pixels displaying blue (B) includes a blue OLED. The R OLED, the G OLED, and the B OLED have different emission efficiencies. Thus, when the pixels generating the unwanted current deviation display different colors, the unwanted current deviation does not result in a longitudinal dim that is plainly visible. However, when the pixels generating the unwanted current deviation display the same color, the unwanted current deviation results in a longitudinal dim that is very noticeable. In other words, the problem of the current deviation is magnified when the pixels displaying the same color are selectively connected to the first demux switches S11, S21, and S31 and the second demux switches S12, S22, and S32 as shown in FIG. 2.

SUMMARY OF THE INVENTION

Accordingly, the present invention is directed to an active matrix organic light emitting display that substantially obviates one or more of the problems due to limitations and disadvantages of the related art.

An object of the present invention is to provide an organic light emitting display capable of preventing a current deviation from being generated between pixels displaying the same color by designing a demultiplexer (demux) switching circuit and demux switching control signals so that the number of times a kickback voltage influences the pixels displaying the same color is the same for each such pixel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the display device includes a display panel including a plurality of data lines, a plurality of gate lines, and a plurality of pixels coupled to the data lines and gate lines, wherein the data lines include first data lines and second data lines, and the pixels include first color pixels and second color pixels; a data driving circuit to generate data voltages through a plurality of output channels; a gate driving circuit coupled to the gate lines; a timing controller to generate control signals to the data driving circuit and the gate driving circuit; and a demultiplexer (demux) switching circuit including a plurality of first demux switches coupled to the output channels and to the first data lines to supply, when turned on, the data voltages from the output channels to the first data lines, and a plurality of second demux switches coupled to the output channels and to the second data lines to supply, when turned on, the data voltages from the output channels to the second data lines; wherein at least one of the first color pixels and at least one of the second color pixels are each coupled to one of the gate lines and to a respective one of the first data lines, and another of the first color pixels and another of the second color pixels are each coupled to the one gate line and to a respective one of the second data lines.

In another aspect of the present invention, the a display device includes: a display panel including a plurality of data lines, a plurality of gate lines, and a plurality of pixels coupled to the data lines and gate lines, wherein the pixels include first, second, and third color pixels, and the data lines include first data lines coupled to the first color pixels, second data lines coupled to the second color pixels, and third data lines coupled to the third color pixels; a data driving circuit to generate data voltages through a plurality of output channels; a gate driving circuit coupled to the gate lines; a timing controller to generate control signals to the data driving circuit and the gate driving circuit; and a demultiplexer (demux) switching circuit including a plurality of first demux switches coupled to the output channels and to the first data lines to supply, when turned on, the data voltages from the output channels to the first data lines, a plurality of second demux switches coupled to the output channels and to the second data lines to supply, when turned on, the data voltages from the output channels to the second data lines, and a plurality of third demux switches coupled to the output channels and to the third data lines to supply, when turned on, the data voltage from the output channels to the third data lines.

In yet another aspect of the present invention, the display device includes: a display panel including a plurality of data lines, a plurality of gate lines, and a plurality of pixels coupled to the data lines and gate lines, wherein the pixels include first, second, and third color pixels, and the data lines include first data lines coupled to the first color pixels, second data lines coupled to the second color pixels, and third data lines coupled to the third color pixels; a data driving circuit to generate data voltages through a plurality of output channels, the channels including first output channels and second output channels; a gate driving circuit coupled to the gate lines; a timing controller to generate control signals to the data driving circuit and the gate driving circuit; and a demultiplexer (demux) switching circuit including a plurality of first demux switches coupled to the first output channels and to the first data lines to supply, when turned on, the data voltages from the first output channels to the first data lines, a plurality of lines coupled to the second output channels and to the second data lines to supply the data voltages from the second output channels to the second data lines, and a plurality of second demux switches coupled to the first output channels and to the third data lines to supply, when turned on, the data voltages from the first output channels to the third data lines.

In a further aspect of the present invention, the display device includes: a display panel including a plurality of data lines, a plurality of gate lines, and a plurality of pixels coupled to the data lines and gate lines, wherein the data lines include first data lines and second data lines, and the pixels include first color pixels and second color pixels such that one of the first data lines and one of the second data lines are coupled to respective ones of the first color pixels coupled to one of the gate lines, and another of the first data lines and another of the second data lines are coupled to respective ones of the second color pixels coupled to the one gate line; a data driving circuit to generate data voltages through a plurality of output channels; a gate driving circuit to supply scan signals to the gate lines; a demultiplexer (demux) switching circuit including a plurality of first demux switches coupled to the output channels and to the first data lines to supply, when turned on, the data voltages from the output channels to the first data lines, and a plurality of second demux switches coupled to the output channels and to the second data lines to supply, when turned on, the data voltages from the output channels to the second data lines; and a timing controller to generate control signals to the data driving circuit, the gate driving circuit, and the demux switching circuit, the control signals including a first demux control signal to turn on the first demux switches and a second control signal to turn on the second demux switches, wherein the timing controller is configured to turn the first demux control signal on and then off, and then turn the second demux control signal on and then off, during a period in which one of the scan signals supplied to the one gate line is turned on.

In yet another aspect of the present invention, the display device includes: a display panel including a plurality of data lines, a plurality of gate lines, and a plurality of pixels coupled to the data lines and gate lines, wherein the data lines include first data lines and second data lines, and the pixels include first color pixels and second color pixels such that one of the first data lines and one of the second data lines are coupled to respective ones of the first color pixels coupled to one of the gate lines and nearest to each other, and another of the first data lines and another of the second data lines are coupled to respective ones of the second color pixels coupled to the one gate line and nearest to each other; a data driving circuit to generate data voltages through a plurality of output channels; a gate driving circuit to supply scan signals to the gate lines; a demultiplexer (demux) switching circuit including a plurality of first demux switches coupled to the output channels and to the first data lines to supply, when turned on, the data voltages from the output channels to the first data lines, and a plurality of second demux switches coupled to the output channels and to the second data lines to supply, when turned on, the data voltages from the output channels to the second data lines; and a timing controller to generate control signals to the data driving circuit, the gate driving circuit, and the demux switching circuit, wherein the timing controller is configured to supply a first demux control signal to the first demux switches and a second control signal to the second demux switches so that, during a predetermined period, a kickback voltage is applied a same number of times to the respective ones of the first color pixels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts.

Example embodiments of the invention will be described with reference to FIGS. 4 to 16.

Figure 4:
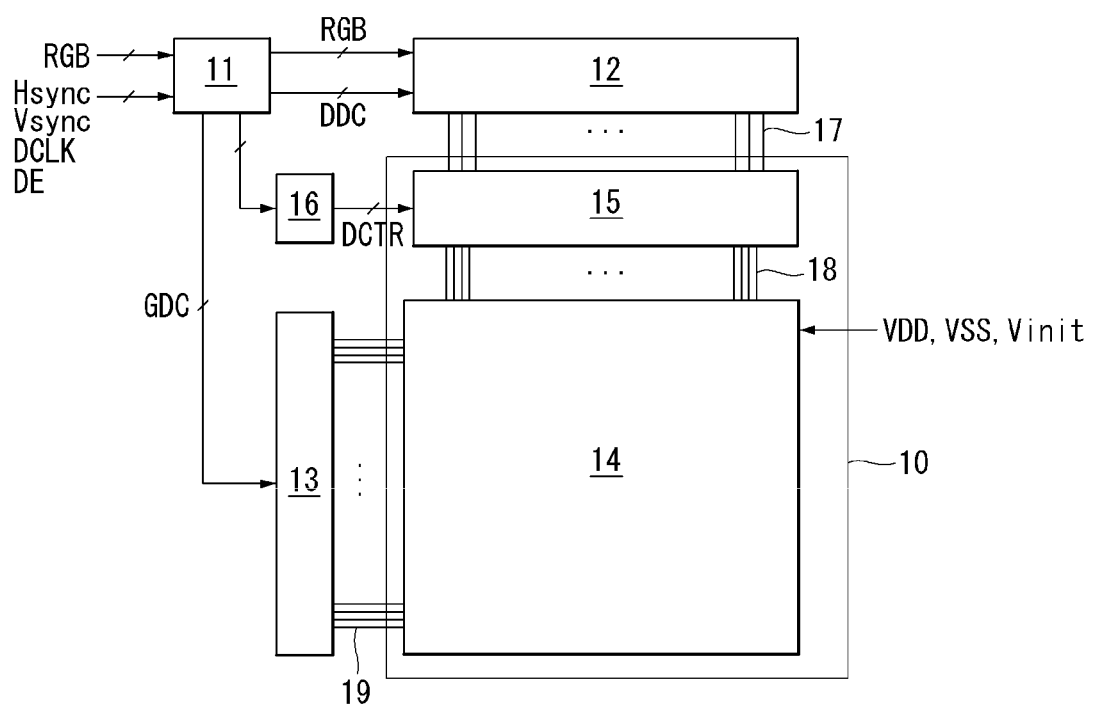
FIG. 4 shows an organic light emitting display according to an exemplary embodiment of the invention.
Figure 5:
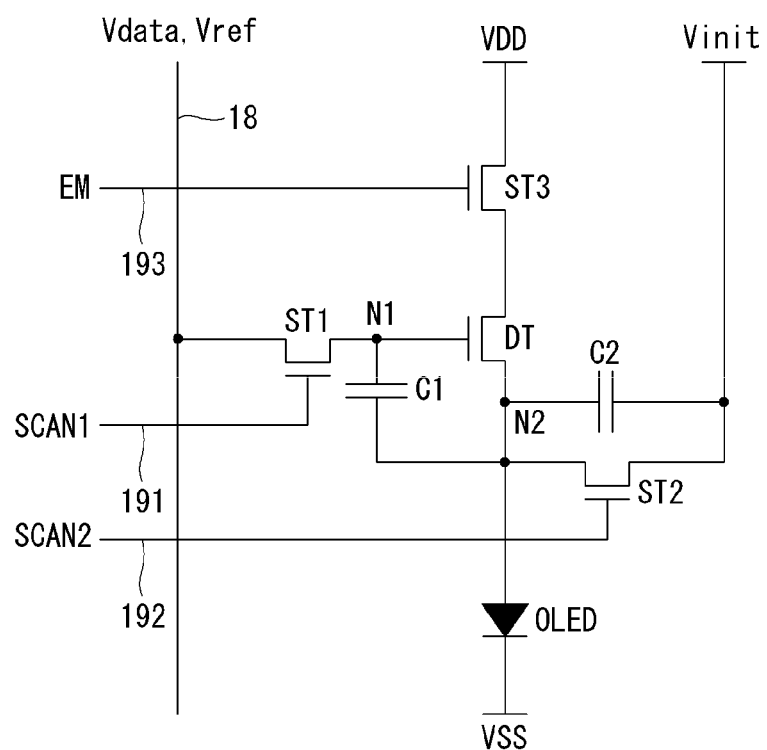
FIG. 5 shows an example of a pixel according to an embodiment of the present invention.

FIG. 4 shows an organic light emitting display according to an embodiment of the invention. FIG. 5 shows an example of a pixel.

As shown in FIGS. 4 and 5, an organic light emitting display according to an embodiment of the invention includes a display panel 10 including a plurality of pixels, a data driving circuit 12 generating a data voltage Vdata to be applied to the pixels, a gate driving circuit 13 generating a gate signal to be applied to the pixels, a timing controller 11 for controlling operation timing of the data driving circuit 12 and the gate driving circuit 13, a demultiplexer (demux) switching circuit 15 which demultiplexes the data voltage Vdata received from the data driving circuit 12 and supplies the demultiplexed data voltage Vdata to data lines 18, and a control signal generator 16 generating demux switching control signals DCTR. Alternatively, the timing controller 11 may be configured to generate the demux switching control signals DCTR and supply them directly to the demux switching circuit 15. For example, the timing controller 11 may be configured to include the control signal generator 16.

The display panel 10 includes a pixel array 14, on which an image is displayed. The pixel array 14 includes the plurality of data lines 18, a plurality of gate lines 19 crossing the data lines 18, and a plurality of pixels positioned at the intersections of the data lines 18 and the gate lines 19. The pixels include a plurality of red (R) pixels, each of which includes a red organic light emitting diode (OLED) and displays the red color, a plurality of green (G) pixels, each of which includes a green OLED and displays the green color, a plurality of blue (B) pixels, each of which includes a blue OLED and displays the blue color. The pixels may also include a plurality of white (W) pixels, each of which includes a white OLED and displays the white color. Alternatively, the pixels may use OLEDs generating the same color and color filters to display different colors. In an example pixel shown in FIG. 5, gate line 19 includes a first scan line 191, a second scan line 192, and an emission line 193. The pixel is connected to one data line 18 and the three signal lines 191, 192, and 193 constituting one gate line 19. The pixel may receive the data voltage Vdata and a reference voltage Vref through the data line 18. The pixel receives a first scan signal SCAN1 through the first scan line 191, receives a second scan signal SCAN2 through the second scan line 192, and receives an emission signal EM through the emission line 193. The pixel may receive a high potential cell driving voltage VDD, a low potential cell driving voltage VSS, and an initialization voltage Vinit from a power generator (not shown).

The example pixel of FIG. 5 includes an OLED, a driving thin film transistor (TFT) DT, a first switching TFT ST1, a second switching TFT ST2, a third switching TFT ST3, a first capacitor C1, and a second capacitor C2.

Figure 1:
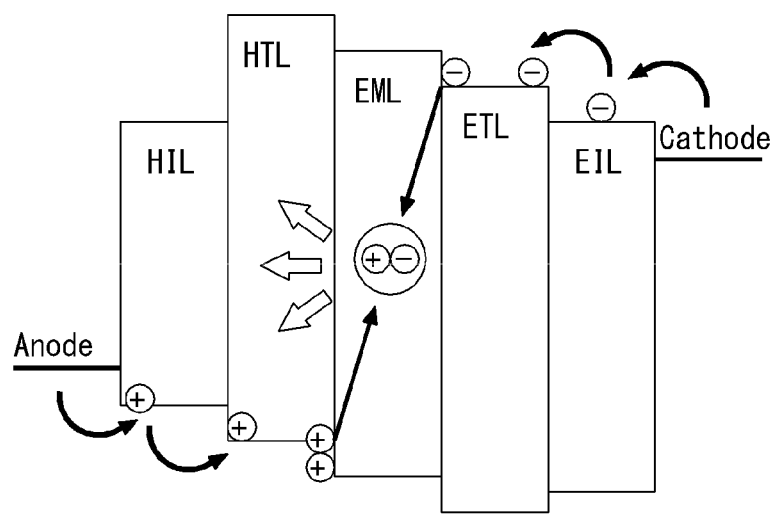
FIG. 1 shows an organic light emitting diode and its emission principle according to the related art.
Figure 2:
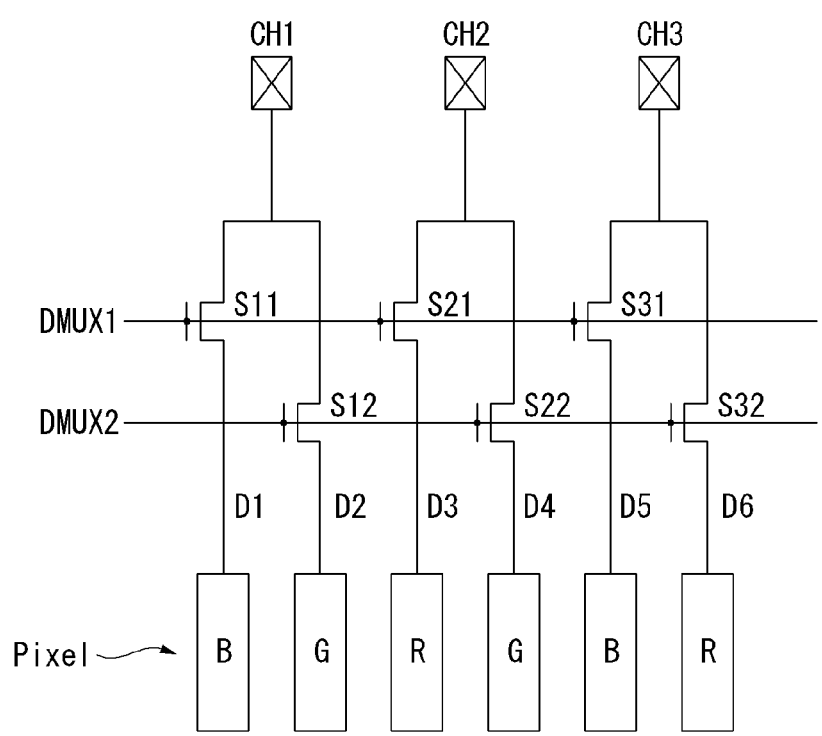
FIG. 2 shows an existing 1 to 2 demultiplexer (demux) driving method according to the related art.
Figure 3:
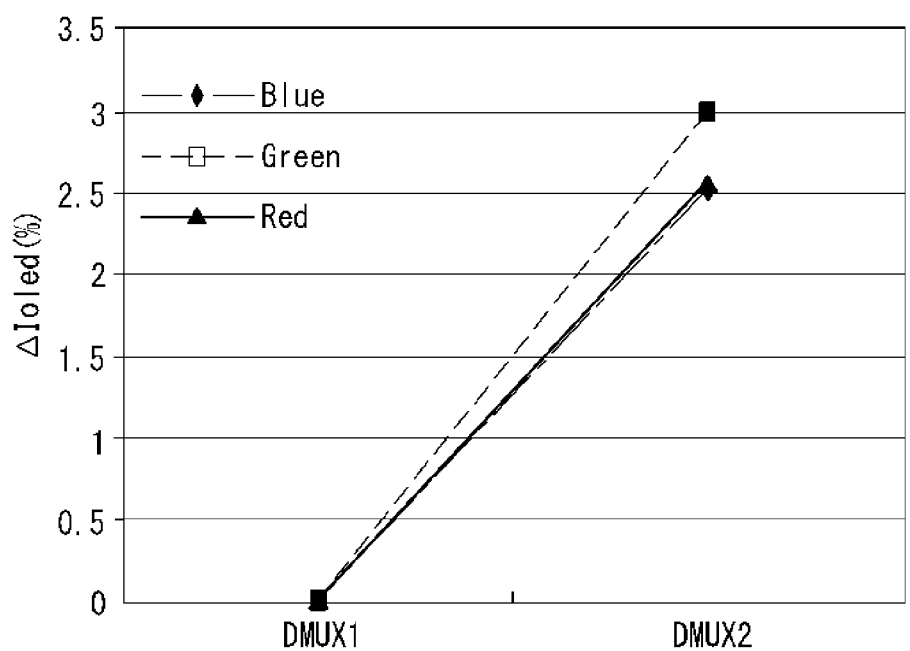
FIG. 3 shows a current deviation between adjacent pixels resulting from a difference between the number of times a kickback voltage influences the adjacent pixels according to the related art.

The OLED emits light using a driving current supplied from the driving TFT DT. An organic compound layer having a multi-layered structure is formed between an anode electrode and a cathode electrode of the OLED as shown in FIG. 1. The anode electrode of the OLED is connected to a second node N2 of the driving TFT DT, and the cathode electrode of the OLED is connected to an input terminal of the low potential cell driving voltage VSS.

The driving TFT DT controls the driving current applied to the OLED using a gate-source voltage of the driving TFT DT. A gate electrode of the driving TFT DT is connected to a first node N1, a drain electrode of the driving TFT DT is connected to a source electrode of the third switching TFT ST3, and a source electrode of the driving TFT DT is connected to the second node N2.

The first switching TFT ST1 switches on a current path between the data line 18 and the first node N1 in response to the first scan signal SCAN1. The first switching TFT ST1 is turned on and thus supplies one of the reference voltage Vref and the data voltage Vdata, which are alternately applied to the data line 18, to the first node N1. A gate electrode of the first switching TFT ST1 is connected to the first scan line 191, a drain electrode of the first switching TFT ST1 is connected to the data line 18, and a source electrode of the first switching TFT ST1 is connected to the first node N1.

The second switching TFT ST2 switches on a current path between an input terminal of the initialization voltage Vinit and the second node N2 in response to the second scan signal SCAN2. The second switching TFT ST2 is turned on and thus supplies the initialization voltage Vinit to the second node N2. A gate electrode of the second switching TFT ST2 is connected to the second scan line 192, a drain electrode of the second switching TFT ST2 is connected to the input terminal of the initialization voltage Vinit, and a source electrode of the second switching TFT ST2 is connected to the second node N2.

The third switching TFT ST3 switches on a current path between an input terminal of the high potential cell driving voltage VDD and the drain electrode of the driving TFT DT in response to the emission signal EM. When the emission signal EM is applied, the third switching TFT ST3 is turned on and thus supplies the high potential cell driving voltage VDD to the drain electrode of the driving TFT DT. A gate electrode of the third switching TFT ST3 is connected to the emission line 193, a drain electrode of the third switching TFT ST3 is connected to the input terminal of the high potential cell driving voltage VDD, and a source electrode of the third switching TFT ST3 is connected to the drain electrode of the driving TFT DT.

The first capacitor C1 is connected between the first node N1 and the second node N2, and the second capacitor C2 is connected between the second node N2 and the input terminal of the initialization voltage Vinit.

The TFTs included in each pixel may be implemented as an oxide TFT including an oxide semiconductor layer. For large size displays, the oxide TFT exhibits advantageous characteristics with respect to, among other things, electron mobility and process deviation. However, the embodiment of the invention is not limited to oxide TFTs, and different types of TFTs may be used. For example, the semiconductor layer of the TFT may be formed of amorphous silicon, polycrystalline silicon, and other material known to those skilled in the art. The embodiment of the invention describes an n-type TFT as an example, but a p-type TFT may be used.

The timing controller 11 rearranges digital video data RGB received from an outside source in conformity with a resolution of the display panel 10 and supplies the rearranged digital video data RGB to the data driving circuit 12. As shown in FIG. 4, the timing controller 11 generates a data control signal DDC for controlling operation timing of the data driving circuit 12 and a gate control signal GDC for controlling operation timing of the gate driving circuit 13 based on timing signals, such as a vertical sync signal Vsync, a horizontal sync signal Hsync, a dot clock DCLK, and a data enable signal DE.

The data driving circuit 12 converts the digital video data RGB received from the timing controller 11 into an analog signal based on the data control signal DDC and generates the data voltage Vdata. The data driving circuit 12 also generates the reference voltage Vref of a constant level. The data driving circuit 12 alternately outputs the reference voltage Vref and the data voltage Vdata in one horizontal period 1H in accordance with the example driving timing diagrams shown in FIGS. 7, 10, 12, 14, and 16. The data driving circuit 12 has output channels, of which the number is less than the number of data lines 18 of the display panel 10. The data driving circuit 12 simultaneously outputs the reference voltage Vref through all of the output channels during a portion of one horizontal period 1H and simultaneously outputs the respective data voltage Vdata through each of the output channels during the remaining portion of the one horizontal period 1H. In the example embodiments disclosed herein, one horizontal period 1H is defined as a value obtained by dividing one frame period by a vertical resolution of the display panel.

Figure 7:
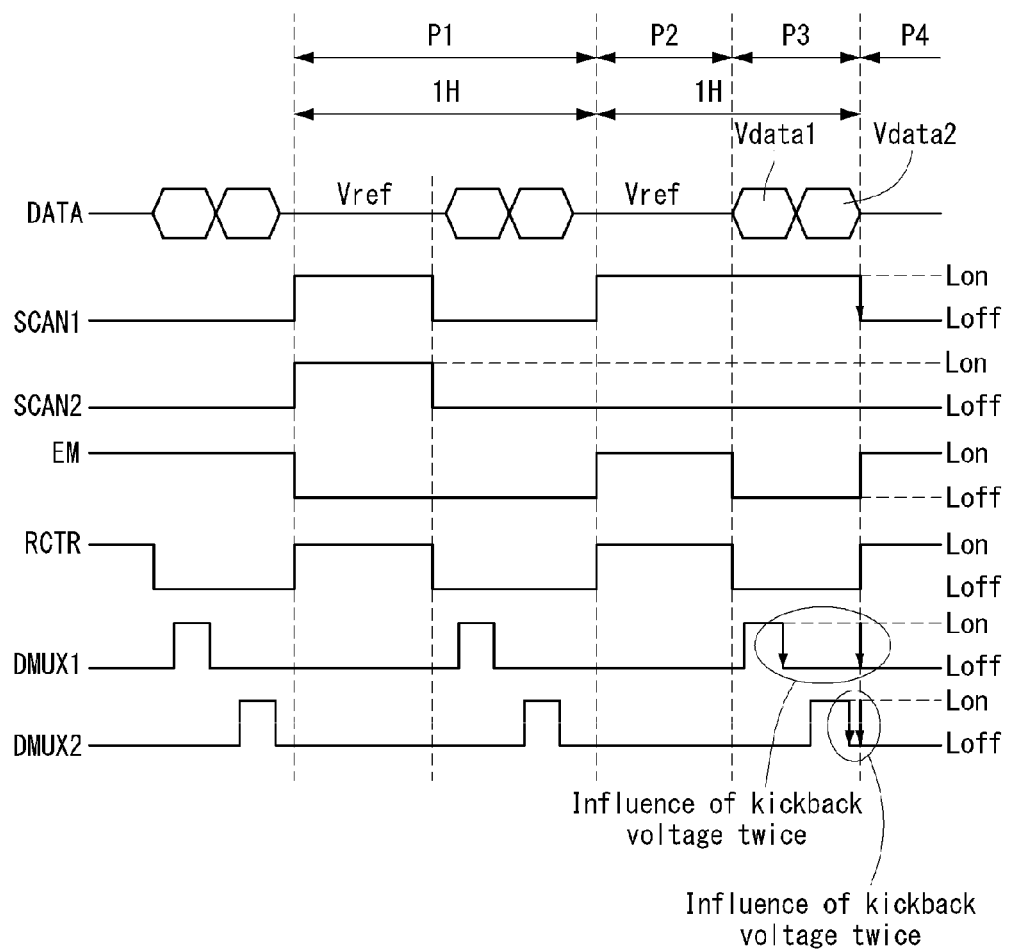
FIG. 7 shows driving timing of a pixel shown in FIG. 5 and a demux switching circuit shown in FIG. 6.

The gate driving circuit 13 generates the gate signal, namely the first and second scan signals SCAN1 and SCAN2 and the emission signal EM based on the gate control signal GDC. The gate driving circuit 13 supplies the first scan signal SCAN1 sequentially to the first scan lines 191 while shifting a phase of the first scan signal SCAN1 in a line sequential manner and supplies the second scan signal SCAN2 sequentially to the second scan lines 192 while shifting a phase of the second scan signal SCAN2 in the line sequential manner. In the same manner as the first and second scan signals SCAN1 and SCAN2, the gate driving circuit 13 supplies the emission signal EM sequentially to the emission lines 193 while shifting a phase of the emission signal EM in the line sequential manner. The first scan signal SCAN1 may be implemented as a single waveform having one on-level period in one frame period as shown in the examples of FIGS. 10, 12, 14, and 16, or may be implemented as a double waveform having two on-level periods in one frame period as shown in the example of FIG. 7. The second scan signal SCAN2 may be implemented as a single waveform in one frame period, and the emission signal EM may be implemented as a double waveform in one frame period. The gate driving circuit 13 may be directly formed on the display panel 10 through a gate driver-in panel (GIP) process.

Figure 6:
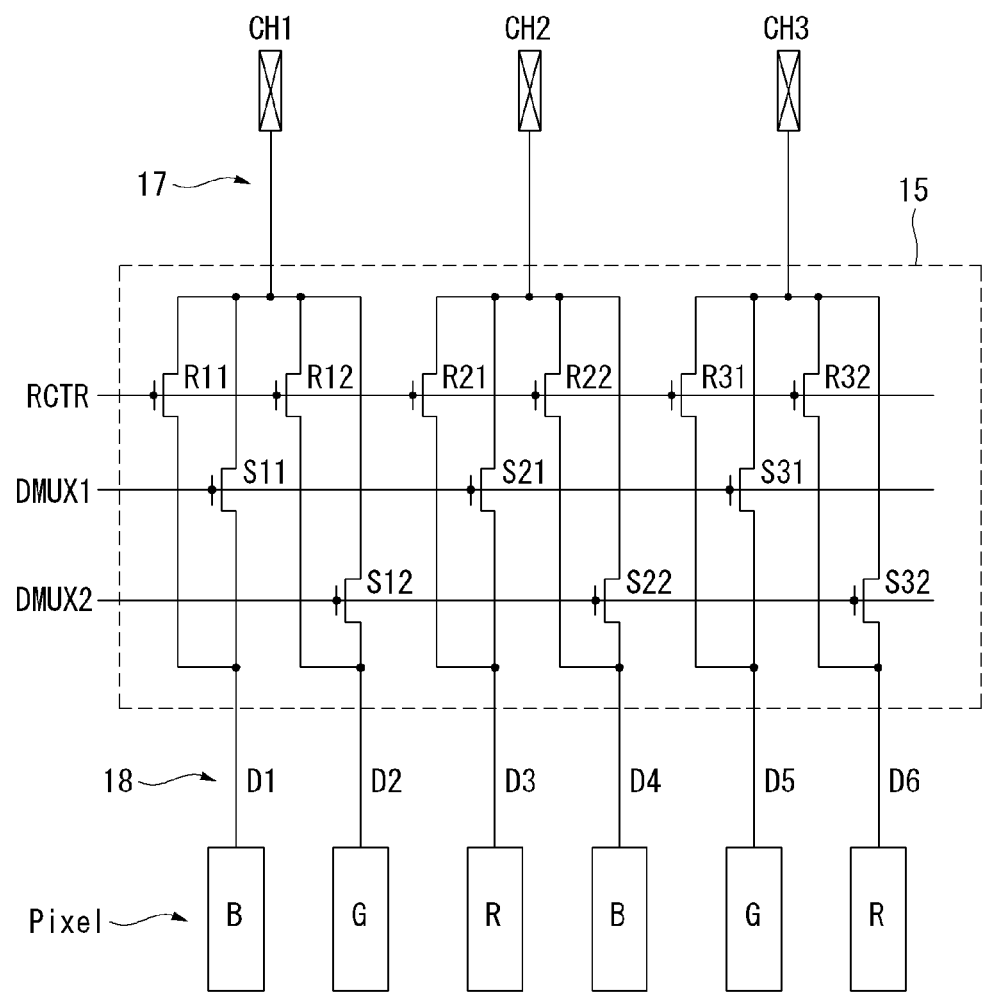
FIG. 6 shows an example of a demux switching circuit for a 1 to 2 demux drive according to an embodiment of the present invention.
Figure 11:
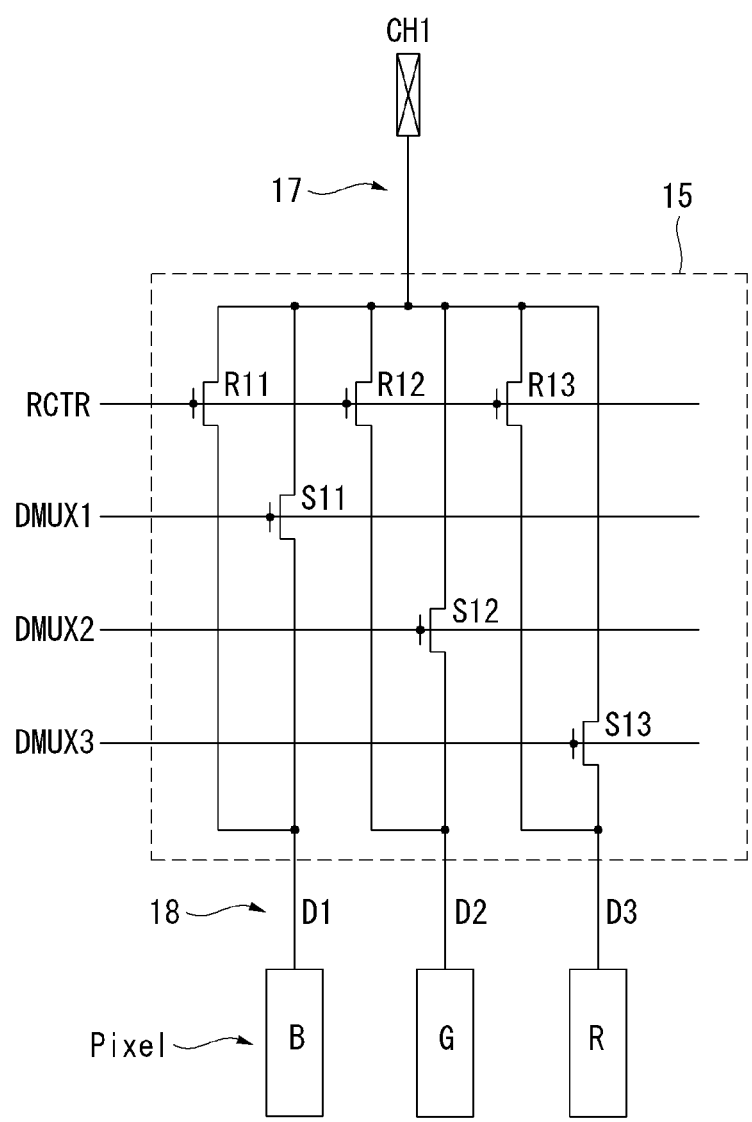
FIG. 11 shows an example of a demux switching circuit for a 1 to 3 demux drive according to yet another embodiment of the present invention.

The demux switching circuit 15 is connected to the data driving circuit 12 through source bus lines 17 and also is connected to the pixels through the data lines 18. The demux switching circuit 15 may time-division supply the data voltage Vdata received from one output channel of the data driving circuit 12 to N data lines 18 of the display panel 10, or may time-division supply the reference voltage Vref received from one output channel of the data driving circuit 12 to the N data lines 18 of the display panel 10. For this, the demux switching circuit 15 may include the first to Nth demux switches connected to each output channel of the data driving circuit 12, where N is a positive integer equal to or greater than 2. The first to Nth demux switches are turned on in response to the first to Nth demux control signals, respectively. The demux switching circuit 15 may further include the first to Nth auxiliary switches for switching on only the supply of the reference voltage Vref as shown in FIGS. 6 and 11. The first to Nth demux switches may be designed to switch on only the supply of the data voltage Vdata. The first to Nth auxiliary switches are simultaneously turned on in response to an auxiliary control signal.

The control signal generator 16 generates the demux switching control signals DCTR. The demux switching control signals DCTR include the first to Nth demux control signals and the auxiliary control signal. The control signal generator 16 may be mounted inside the timing controller 11.

In the following description, various embodiments of the demux switching circuit and the demux switching control signals are described wherein that the pixels displaying the same color are influenced the same number of times by a kickback voltage in a demux driving method.

First Embodiment

An organic light emitting display according to a first embodiment of the invention includes a demux switching circuit for a 1 to N demux, so that pixels displaying the same color are influenced the same number of times by a kickback voltage in a demux driving method. Further, the organic light emitting display according to the first embodiment of the invention generates the first to Nth demux control signals, which sequentially rise to an on-level and then sequentially fall to an off-level in a programming period, in which a first scan signal is held at an on-level so as to apply data voltage Vdata to pixels.

FIG. 6 shows an example of the demux switching circuit for 1 to 2 demux in the organic light emitting display according to the first embodiment of the invention. FIG. 7 shows driving timing of the pixel shown in FIG. 5 and the demux switching circuit shown in FIG. 6. FIGS. 8A to 8D show an operation state of a pixel in each of driving stages.

The demux switching circuit 15 shown in FIG. 6 includes first demux switches S11, S21, and S31 and second demux switches S12, S22, and S32, which are connected to output channels CH1, CH2, and CH3 of the data driving circuit, respectively. The demux switching circuit 15 divides signals received from the data driving circuit using a 1 to 2 demultiplexing method and outputs the divided signals to data lines D1 to D6. Because the 1 to 2 demux is applied to pixels displaying three colors, pixels of the same color are selectively connected to the first demux switches S11, S21, and S31 simultaneously operating in response to a first demux control signal DMUX1 and the second demux switches S12, S22, and S32 simultaneously operating in response to a second demux control signal DMUX2. For example, a B pixel is connected to the first demux switch S11 through the first data line D1, and another B pixel is connected to the second demux switch S22 through the fourth data line D4. Further, a G pixel is connected to the second demux switch S12 through the second data line D2, and another G pixel is connected to the first demux switch S31 through the fifth data line D5. Further, an R pixel is connected to the first demux switch S21 through the third data line D3, and another R pixel is connected to the second demux switch S32 through the sixth data line D6.

If a current deviation is generated between the pixels of the same color in the 1 to 2 demux, the current deviation may become a problem as described in the related art. To solve the problem, as shown in FIG. 7, this embodiment of the invention generates the first and second demux control signals DMUX1 and DMUX2 so that they sequentially rise to an on-level and then sequentially fall to an off-level in a programming period P3. Hence, pixels connected to the first demux switches S11, S21, and S31 and pixels connected to the second demux switches S12, S22, and S32 are influenced the same number of times by the kickback voltage. The first scan signal SCAN1 falls to the off-level for an emission period P4 following the programming period P3, and both the first and second demux control signals DMUX1 and DMUX2 fall to the off-level earlier than the first scan signal SCAN1.

Accordingly, each pixel irrespective of the color is affected by the kickback voltage once when the demux switch connected to the pixel is turned off in response to one of the first and second demux control signals DMUX1 and DMUX2 falling to the off-level, and is again affected by the kickback voltage when the first switching TFT ST1 of the pixel is turned off in response to the first scan signal SCAN1 falling to the off-level. Namely, because each pixel is affected by the kickback voltage twice irrespective of the color of the pixel, the embodiment of the invention prevents the current deviation from being generated by a difference between the number of times the kickback voltage influences adjacent pixels.

To drive the pixels disposed on one horizontal pixel line, an initialization period P1 for initializing the pixels may be assigned before the programming period P3, and a sensing period P2 for sensing threshold voltages of the driving TFTs DT included in the pixels may be assigned between the initialization period P1 and the programming period P3. The initialization period P1 may be selected as one horizontal period 1H, and the sensing period P2 and the programming period P3 combined may be selected as one horizontal period 1H. The initialization period P1 of the pixels disposed on an Nth horizontal pixel line may overlap the sensing period P2 and the programming period P3 of the pixels disposed on an (N−1)th horizontal pixel line, so as to secure a margin of the driving timing.

The reference voltage Vref and the data voltage are alternately input to the demux switching circuit 15 on a per horizontal period (1H) basis. The reference voltage Vref is input in the initialization period P1 and in the sensing period P2, and the data voltage for the selected horizontal pixel line is input in the programming period P3. The demux switching circuit 15 may further include first auxiliary switches R11, R21, and R31 respectively connected in parallel to the first demux switches S11, S21, and S31 and second auxiliary switches R12, R22, and R32 respectively connected in parallel to the second demux switches S12, S22, and S32, so as to time-divide the supply timings of the reference voltage Vref and the data voltage. The first and second auxiliary switches are simultaneously turned on in the initialization period P1 and the sensing period P2 in response to an auxiliary control signal RCTR supplied from the control signal generator 16, and may supply the reference voltage Vref to all of the data lines D1 to D6. The first demux switches S11, S21, and S31 are turned on in response to the first demux control signal DMUX1, and supplies a data voltage Vdata1 to data lines D1, D3, and D5 in the programming period P3. The second demux switches S12, S22, and S32 are turned on in response to the second demux control signal DMUX2, and supplies a data voltage Vdata2 to data lines D2, D4, and D6 in the programming period P3.

The first scan signal SCAN1 is implemented as a double waveform having two on-level periods and may have an on-level Lon in a portion of the initialization period P1, the sensing period P2, and the programming period P3. The second scan signal SCAN2 is implemented as a single waveform having one on-level period and may have the on-level Lon in synchronization with the first scan signal SCAN1 in a portion of the initialization period P1. The emission signal EM is implemented as a double waveform having two on-level periods and may have the on-level Lon in the sensing period P2 and the emission period P4. The auxiliary control signal RCTR may have the on-level Lon in synchronization with the supply timing of the reference voltage Vref.

An operation state of a pixel in each of driving stages is described with reference to FIGS. 8A to 8D.

Figure 8A:
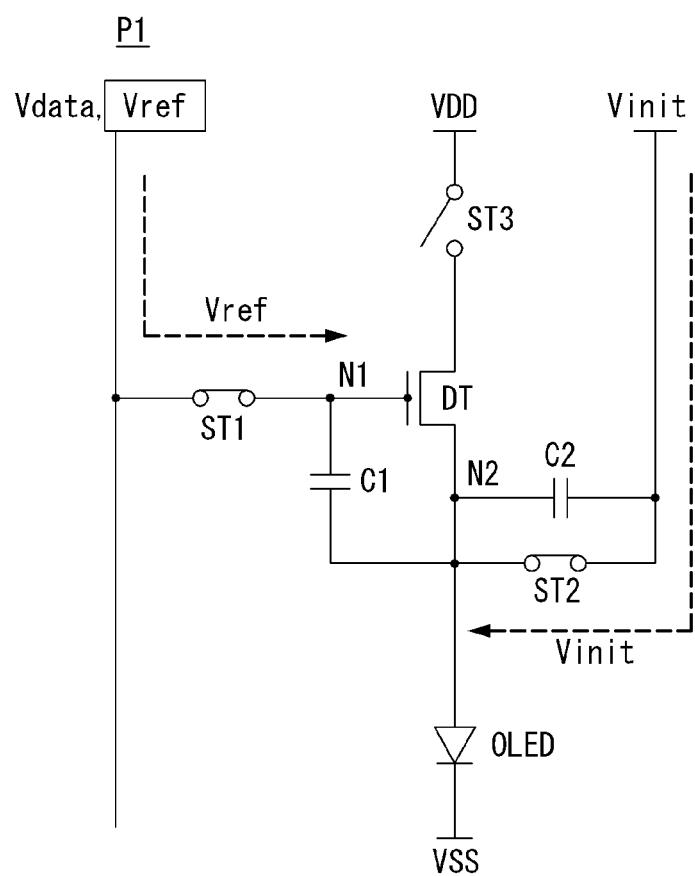
FIGS. 8A to 8D show an operation state of a pixel in each of driving stages according to an embodiment of the present invention.
Figure 8B:
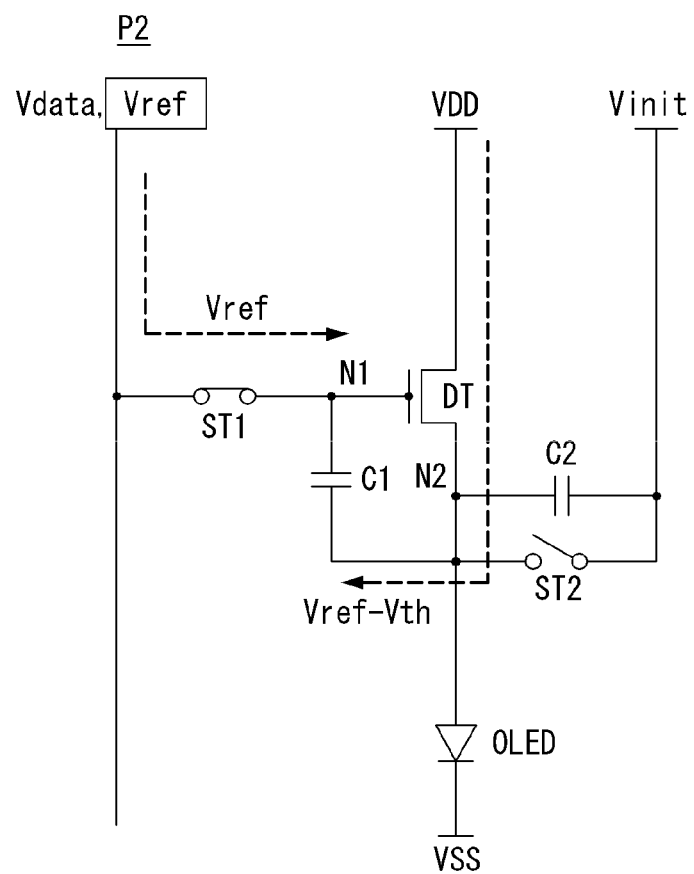

In the initialization period P1, as shown in FIG. 8A, the first and second switching TFTs ST1 and ST2 are turned on. Hence, the first node N1 is initialized to the reference voltage Vref, and the second node N2 is initialized to the initialization voltage Vinit. In the sensing period P2, as shown in FIG. 8B, the first and third switching TFTs ST1 and ST3 are turned on. Hence, a potential of the second node N2 is sampled to a voltage (Vref−Vth), where 'Vth' is a threshold voltage of the driving TFT DT. In the initialization period P1 and the sensing period P2, the data line is charged to the reference voltage Vref by a turn-on operation of the auxiliary switch.

Figure 8C:
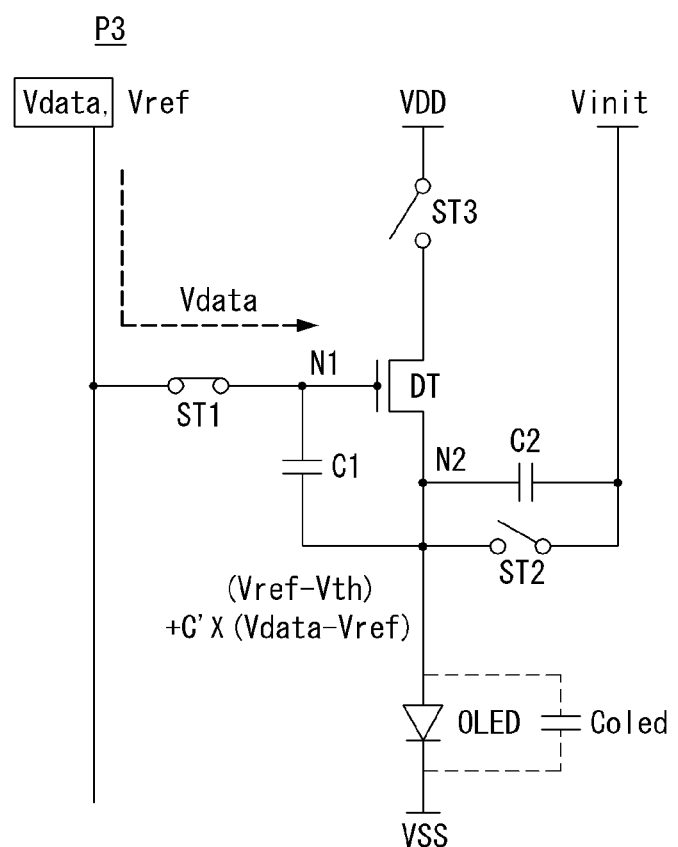

In the programming period P3, as shown in FIG. 8C, the first switching TFT ST1 is turned on, and thus the data voltage Vdata is applied to the first node N1. In this instance, the potential of the second node N2 is changed to a voltage (Vref−Vth+C'(Vdata−Vref)) because of the capacitance coupling resulting from a capacitance distribution ratio (C'=C1/(C1+C2+Coled)) of the first and second capacitors C1 and C2. In particular, in the programming period P3, first and second demux switches alternately operate, and the data voltage is charged to each data line. According to the embodiment of the invention, because all of the pixels are influenced by the kickback voltages the same number of times irrespective of operation order of the first and second demux switches, the current deviation between the pixels is not generated.

Figure 8D:
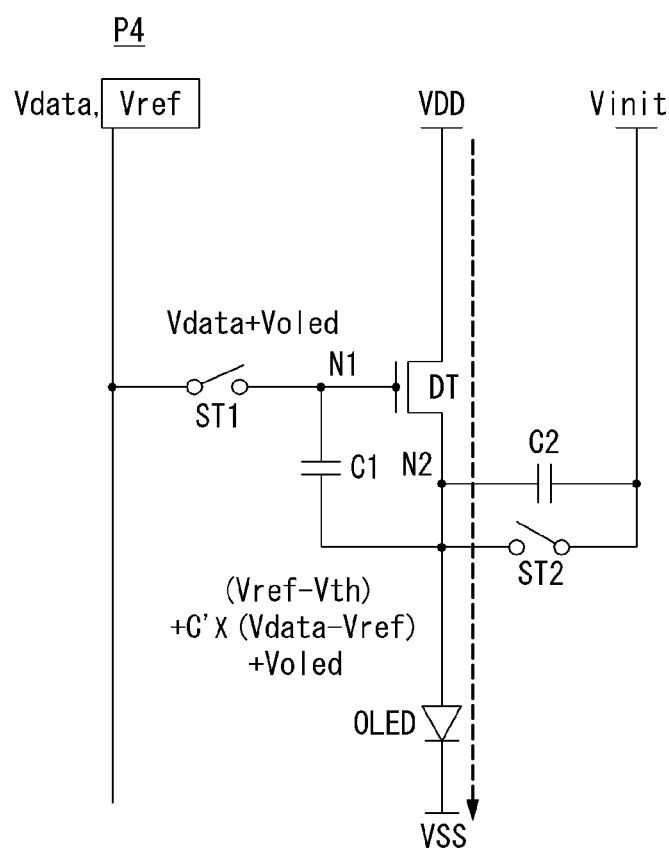

In the emission period P4, as shown in FIG. 8D, the third switching TFT ST3 is turned on, and the high potential cell driving voltage VDD is supplied to the pixel. Hence, the OLED is turned on and emits light during one frame period. In the emission period P4, a driving current holed flowing in the OLED is calculated as k(Vdata−Vref−C'(Vdata−Vref))². According to the above equation, a deviation between the threshold voltages Vth of the pixels and a deviation between the high potential cell driving voltages VDD of the pixels are compensated. In the above equation, 'k' is a constant value determined based on the current mobility μ, parasitic capacitance Cox, and channel ratio W/L of the driving TFT DT, as follows:

$$k = \frac{1}{2}\left(\frac{W}{L}\mu Cox\right).$$

Figure 9:
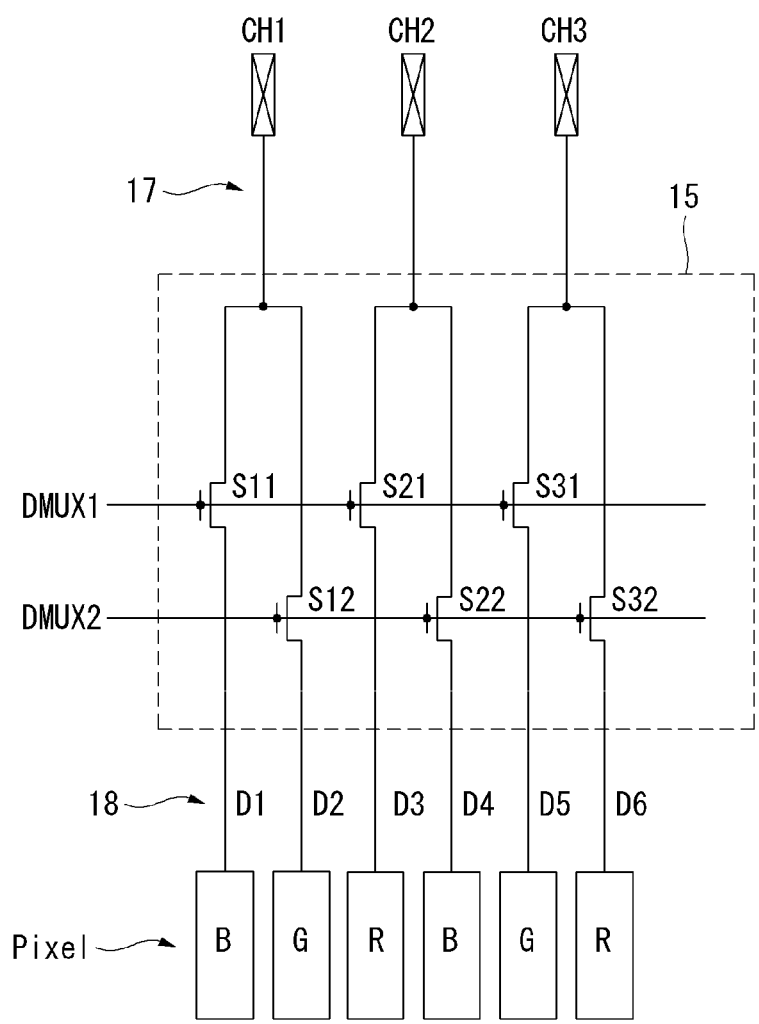
FIG. 9 shows another example of a demux switching circuit for a 1 to 2 demux drive according to another embodiment of the present invention.
Figure 10:
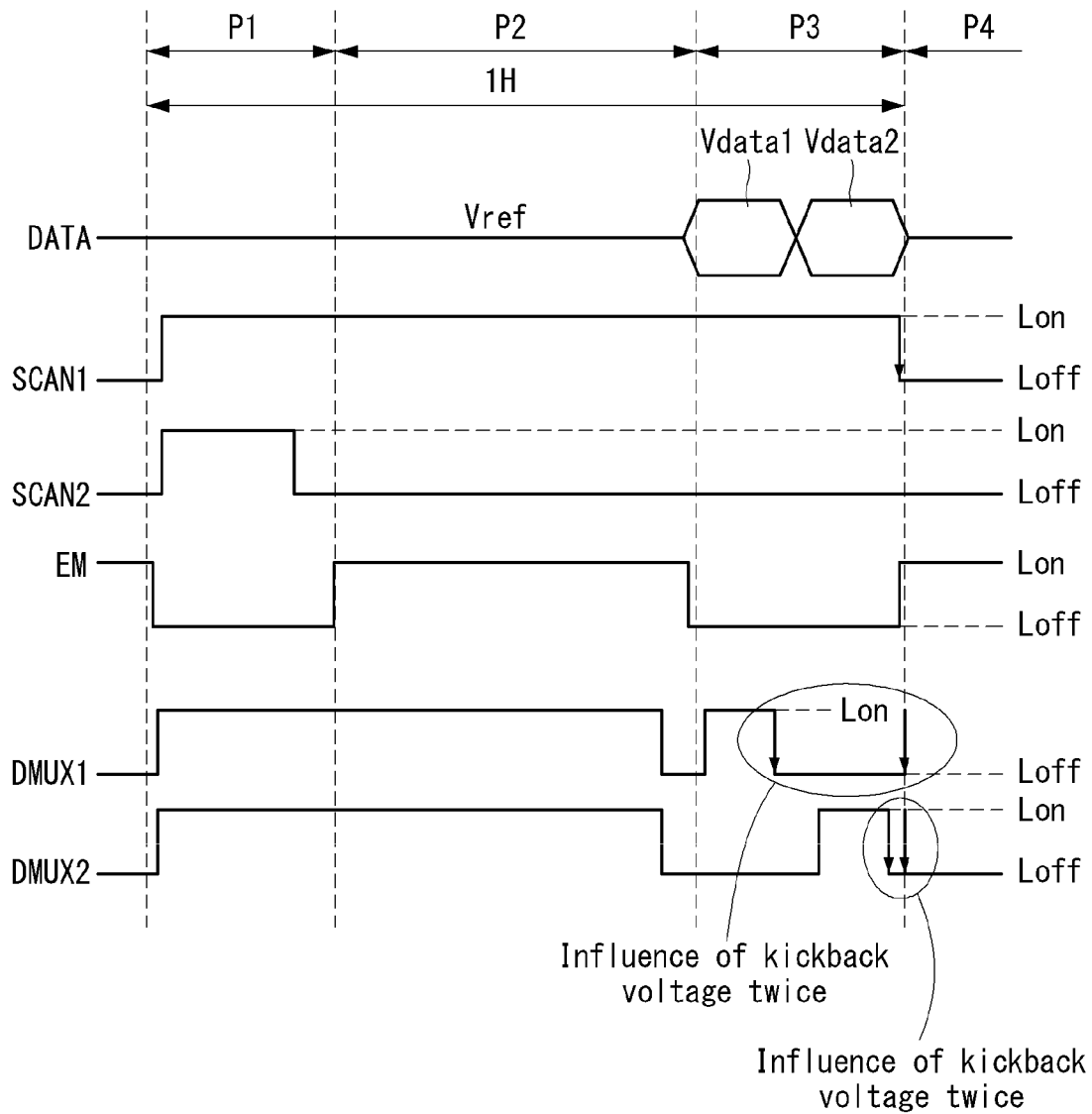
FIG. 10 shows driving timing of a pixel shown in FIG. 5 and a demux switching circuit shown in FIG. 9.

FIG. 9 shows another example of the demux switching circuit for the 1 to 2 demux in the organic light emitting display according to the first embodiment of the invention. FIG. 10 shows driving timing of the pixel shown in FIG. 5 and the demux switching circuit shown in FIG. 9.

The demux switching circuit 15 shown in FIG. 9 includes first demux switches S11, S21, and S31 and second demux switches S12, S22, and S32 connected to output channels CH1, CH2, and CH3 of the data driving circuit, respectively. The demux switching circuit 15 divides signals received from the data driving circuit using a 1 to 2 demultiplexing method and outputs the divided signals to data lines D1 to D6. Because the 1 to 2 demux is applied to pixels of three colors, pixels of the same color are selectively connected to the first demux switches S11, S21, and S31 simultaneously operating in response to the first demux control signal DMUX1 and the second demux switches S12, S22, and S32 simultaneously operating in response to the second demux control signal DMUX2.

The demux switching circuit 15 shown in FIG. 9 is different from the demux switching circuit 15 shown in FIG. 6 in that it does not include separate auxiliary switches. Further, in the demux switching circuit 15 shown in FIG. 9, the first and second demux control signals DMUX1 and DMUX2 are generated as shown in FIG. 10 so that the reference voltage Vref and the data voltage are time-division supplied through demux switches. More specifically, the first and second demux control signals DMUX1 and DMUX2 shown in FIG. 10 are different from those shown in FIG. 7 in that they are held at the on-level Lon in the initialization period P1 and the sensing period P2. The first and second demux switches S11, S21, S31, S12, S22, and S32 are simultaneously turned on in response to the first and second demux control signals DMUX1 and DMUX2, which are synchronized with each other at the on-level Lon in the initialization period P1 and the sensing period P2, and thus supply the reference voltage Vref to the data lines D1 to D6.

In the example shown in FIG. 10, unlike in the example of FIG. 7, the initialization period P1, the sensing period P2, and the programming period P3 of one horizontal pixel line are independent of and do not overlap the periods P1, P2, and P3 of an adjacent horizontal pixel line. In FIG. 10, the initialization period P1, the sensing period P2, and the programming period P3 combined may be selected as one horizontal period. The first scan signal SCAN1 may be implemented as a single waveform having the on-level Lon in the initialization period P1, the sensing period P2, and the programming period P3.

The example shown in FIGS. 9 and 10 has substantially the same operational effect as the example shown in FIGS. 6 and 7. The example shown in FIGS. 9 and 10 is characterized in that the pixels connected to the first demux switches S11, S21, and S31 and the pixels connected to the second demux switches S12, S22, and S32 are influenced by the kickback voltage the same number of times. This is achieved by generating the first and second demux control signals DMUX1 and DMUX2 so that they sequentially rise to the on-level Lon and then sequentially fall to an off-level Loff in the programming period P3 in the same manner as in FIG. 7. In other words, the first scan signal SCAN1 falls to the off-level Loff for an emission period P4 following the programming period P3, and both the first and second demux control signals DMUX1 and DMUX2 fall to the off-level Loff earlier than the first scan signal SCAN1.

Accordingly, each pixel irrespective of the color is affected by the kickback voltage once when the demux switch connected to the pixel is turned off in response to one of the first and second demux control signals DMUX1 and DMUX2 falling to the off-level Loff, and is again affected by the kickback voltage when the first switching TFT ST1 of the pixel is turned off in response to the first scan signal SCAN1 falling to the off-level Loff. Namely, because each pixel is affected by the kickback voltage twice irrespective of the color of the pixel, the embodiment of the invention prevents the current deviation from being generated by a difference between the number of times the kickback voltage influences adjacent pixels.

Figure 12:
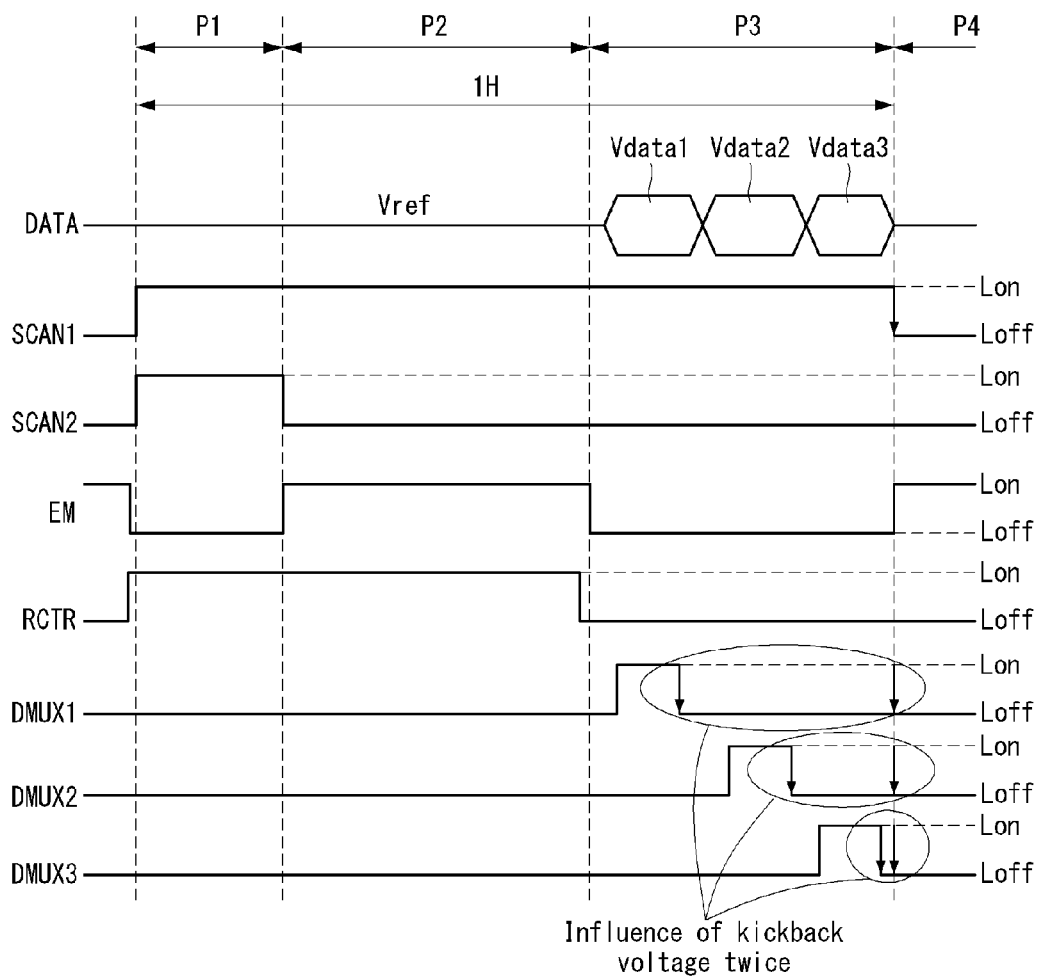
FIG. 12 shows driving timing of a pixel shown in FIG. 5 and a demux switching circuit shown in FIG. 11.

FIG. 11 shows an example of the demux switching circuit for 1 to 3 demux in the organic light emitting display according to the first embodiment of the invention. FIG. 12 shows driving timing of the pixel shown in FIG. 5 and the demux switching circuit shown in FIG. 11.

The demux switching circuit 15 shown in FIG. 11 includes a first demux switch (for example, S11), a second demux switch (for example, S12), and a third demux switch (for example, S13) connected to an output channel (for example, CH1) of the data driving circuit. The demux switching circuit 15 divides a signal received from the data driving circuit using a 1 to 3 demultiplexing method and outputs the divided signals to data lines D1, D2, and D3. Because the 1 to 3 demux is applied to pixels of three colors, first pixels displaying a first color may be connected to the first demux switches (for example, S11, etc.) simultaneously operating in response to a first demux control signal DMUX1, and second pixels displaying a second color may be connected to the second demux switches (for example, S12, etc.) simultaneously operating in response to a second demux control signal DMUX2. Further, third pixels displaying a third color may be connected to the third demux switches (for example, S13, etc.) simultaneously operating in response to a third demux control signal DMUX3.

Because the pixels of the same color correspond to one demux switch in the 1 to 3 demux, the current deviation between the pixels of the same color is not generated without intentionally modulating the first to third demux control signals DMUX1 to DMUX3 as shown in FIG. 12. However, when the first to third demux control signals DMUX1 to DMUX3 are generated as shown in FIG. 12, a current deviation between the pixels of different colors may also be prevented. The current deviation between the pixels of different colors is not plainly visible as a longitudinal dim. However, the image quality of the organic light emitting display may be further improved by also preventing the current deviation between the pixels of different colors.

As shown in FIGS. 11 and 12, an embodiment of the invention may include the pixels connected to the first to third demux switches S11, S12, and S13 are influenced by the kickback voltage the same number of times. This is accomplished by generating the first to third demux control signals DMUX1 to DMUX3 so that they sequentially rise to the on-level Lon and then sequentially fall to the off-level Loff in the programming period P3. In other words, the first scan signal SCAN1 falls to the off-level Loff for the emission period P4 following the programming period P3, and all of the first to third demux control signals DMUX1 to DMUX3 fall to the off-level Loff earlier than the first scan signal SCAN1. The first scan signal SCAN1 may be implemented as a single waveform having the on-level Lon in the initialization period P1, the sensing period P2, and the programming period P3.

Accordingly, each pixel irrespective of the color is affected by the kickback voltage once when the demux switch connected to the pixel is turned off in response to the demux control signal falling to the off-level Loff, and is again affected by the kickback voltage when the first switching TFT ST1 of the pixel is turned off in response to the first scan signal SCAN1 falling to the off-level Loff. Namely, because each pixel is affected by the kickback voltage twice irrespective of the color of the pixel, the embodiment of the invention prevents the current deviation from being generated by a difference between the number of times the kickback voltage influences the adjacent pixels.

In FIG. 12, the initialization period P1, the sensing period P2, and the programming period P3 combined may be selected as one horizontal period. The reference voltage Vref and the data voltage are alternately input to the demux switching circuit 15 on a per horizontal period (1H) basis. The reference voltage Vref is input in the initialization period P1 and the sensing period P2, and the data voltage is input in the programming period P3. The demux switching circuit 15 may further include a first auxiliary switch R11 connected in parallel to the first demux switch S11, a second auxiliary switch R12 connected in parallel to the second demux switch S12, and a third auxiliary switch R13 connected in parallel to the third demux switch S13, so as to time-divide the supply timings of the reference voltage Vref and the data voltage. The first to third auxiliary switches R11, R12, and R13 are simultaneously turned on in the initialization period P1 and the sensing period P2 in response to an auxiliary control signal RCTR supplied from the control signal generator 16, and may supply the reference voltage Vref to all of the data lines D1 to D3. The first demux switch S11 is turned on in response to the first demux control signal DMUX1 and supplies a data voltage Vdata1 to data line D1 in the programming period P3. The second demux switch S12 is turned on in response to the second demux control signal DMUX2 and supplies a data voltage Vdata2 to data line D2 in the programming period P3. The third demux switch S13 is turned on in response to the third demux control signal DMUX3 and supplies a data voltage Vdata3 to data line D3 in the programming period P3.

Figure 13:
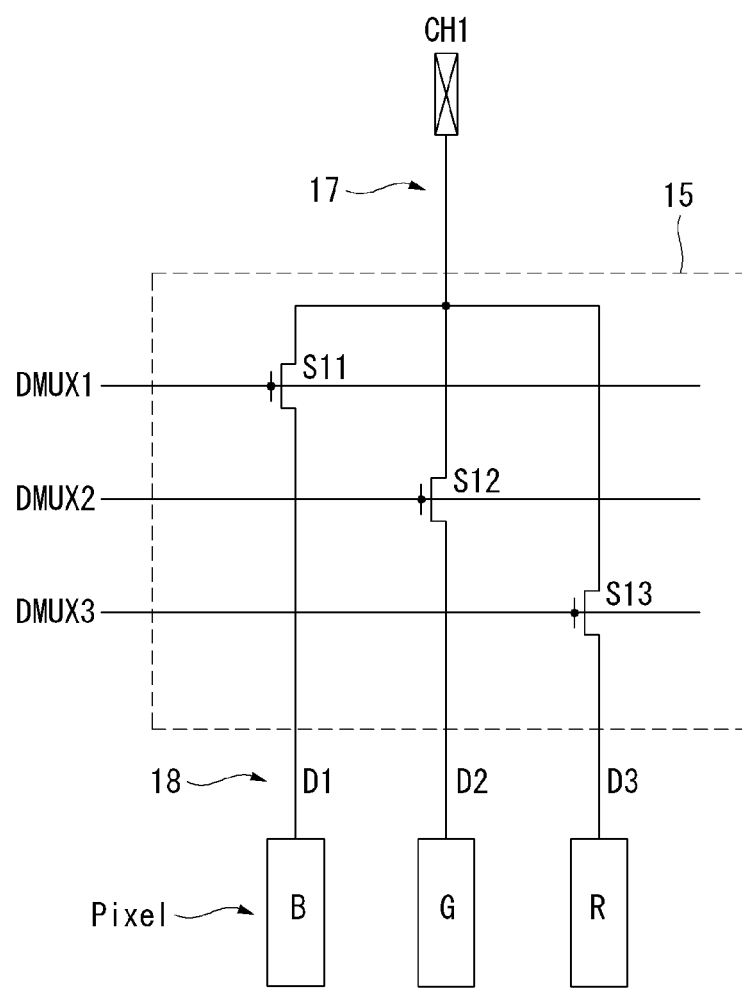
FIG. 13 shows another example of a demux switching circuit for 1 to 3 demux drive according to another embodiment of the present invention.
Figure 14:
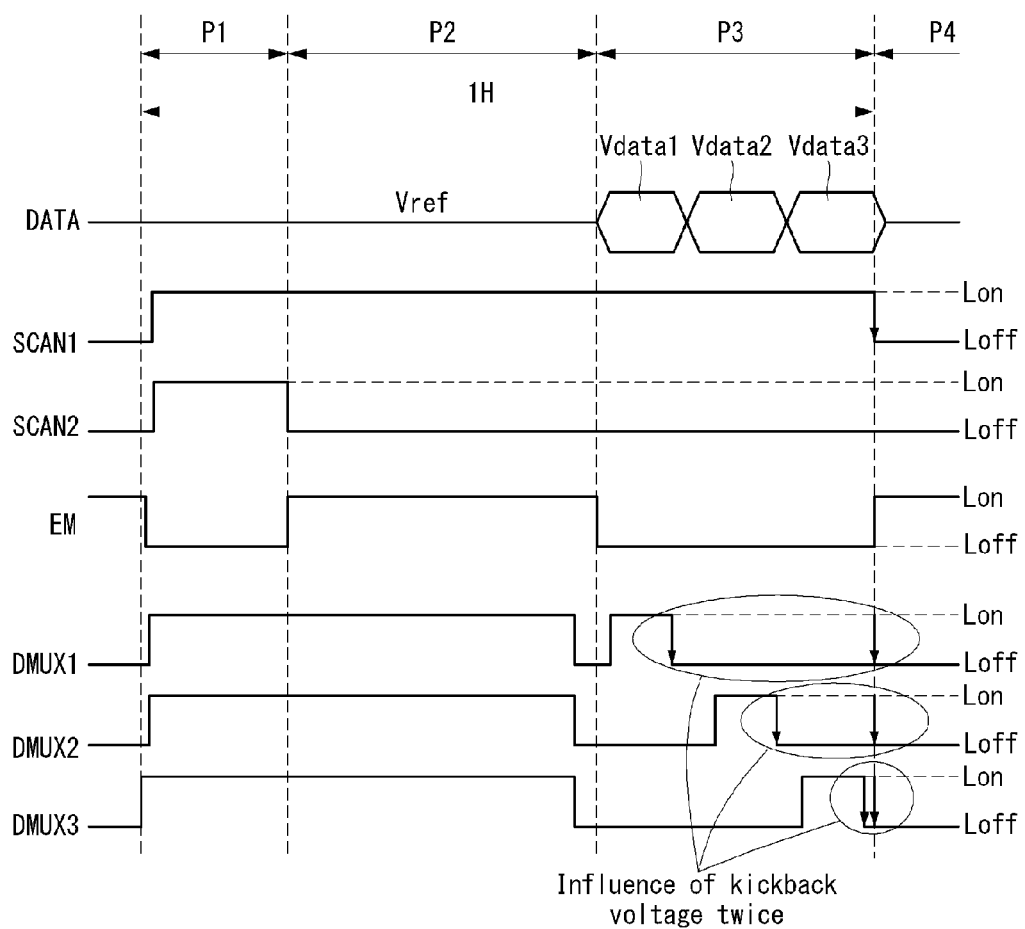
FIG. 14 shows driving timing of a pixel shown in FIG. 5 and a demux switching circuit shown in FIG. 13.

FIG. 13 shows another example of the demux switching circuit for the 1 to 3 demux in the organic light emitting display according to the first embodiment of the invention. FIG. 14 shows driving timing of the pixel shown in FIG. 5 and the demux switching circuit shown in FIG. 13.

The demux switching circuit 15 shown in FIG. 13 is different from the demux switching circuit 15 shown in FIG. 11 in that it does not include separate auxiliary switches. Further, in the demux switching circuit 15 shown in FIG. 13, the first to third demux control signals DMUX1 to DMUX3 are generated as shown in FIG. 14 so that the reference voltage Vref and the data voltage are time-division supplied through demux switches. More specifically, the first to third demux control signals DMUX1 to DMUX3 shown in FIG. 14 are different from those shown in FIG. 12 in that they are held at the on-level Lon in the initialization period P1 and the sensing period P2. The first to third demux switches S11, S12, and S13 are simultaneously turned on in response to the first to third demux control signals DMUX1 to DMUX3, which are synchronized with each other at the on-level Lon in the initialization period P1 and the sensing period P2, and thus supply the reference voltage Vref to the data lines D1 to D3.

The example shown in FIGS. 13 and 14 has substantially the same operational effect as the example shown in FIGS. 11 and 12.

Second Embodiment

An organic light emitting display according to a second embodiment of the invention includes a demux switching circuit which includes first and second demux switches connected to some of the output channels of a data driving circuit and time-division supplies a data voltage received from these output channels of the data driving circuit to two data lines of a display panel, so that pixels displaying the same color are influenced by a kickback voltage the same number of times in a demux driving method.

Figure 15:
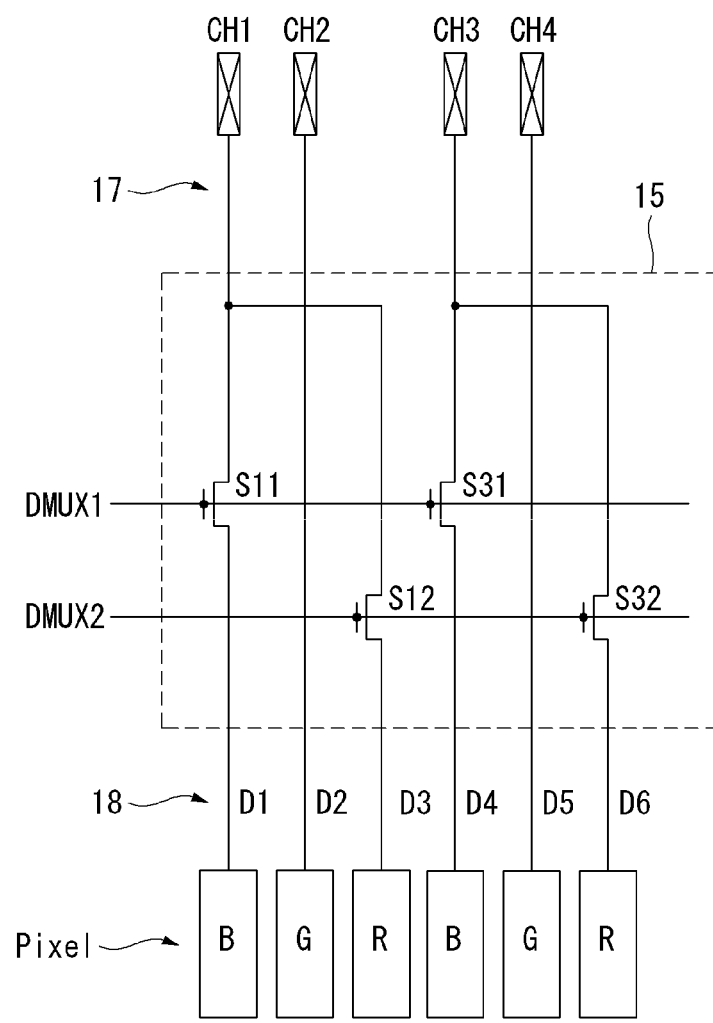
FIG. 15 shows an example of a demux switching circuit for a 2 to 3 demux drive according to an embodiment of the present invention.
Figure 16:
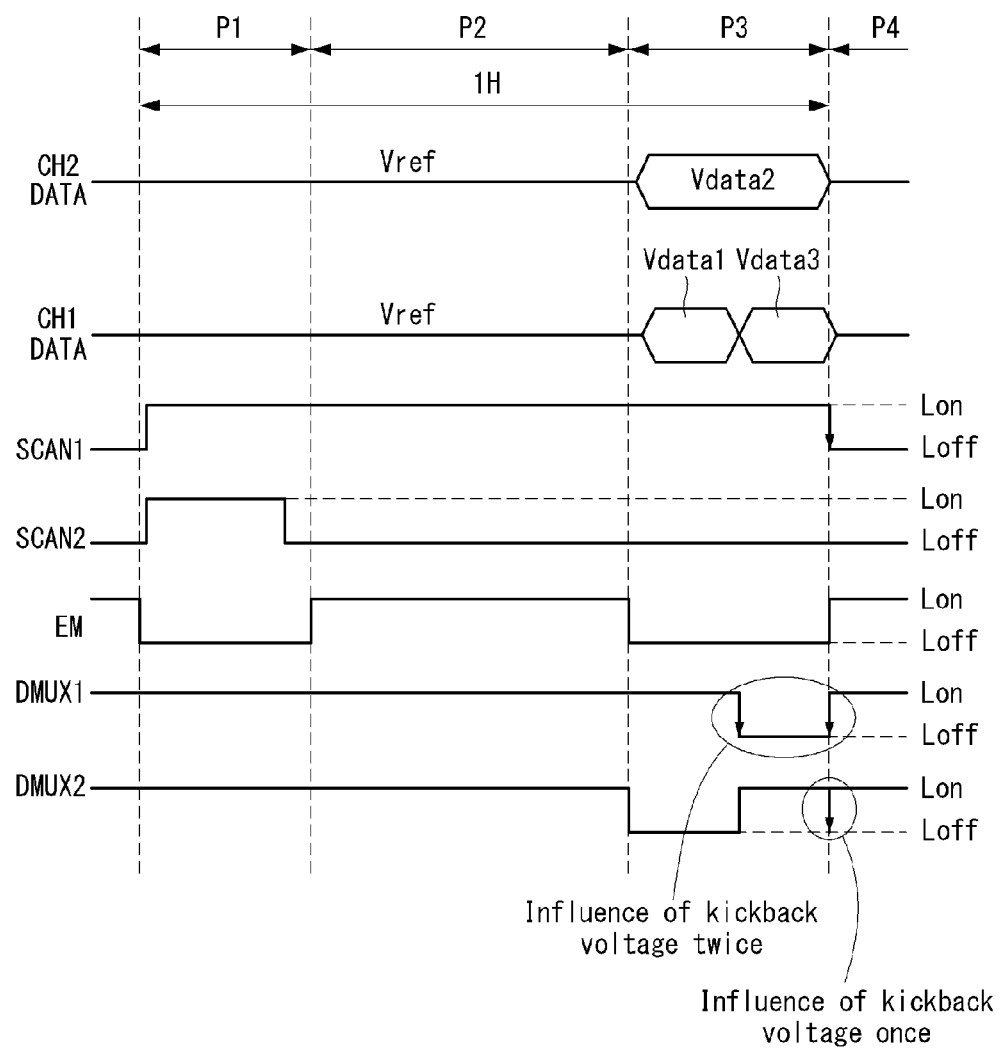
FIG. 16 shows driving timing of a pixel shown in FIG. 5 and a demux switching circuit shown in FIG. 15.

FIG. 15 shows an example of the demux switching circuit for a 2 to 3 demux in the organic light emitting display according to the second embodiment of the invention. FIG. 16 shows driving timing of the pixel shown in FIG. 5 and the demux switching circuit shown in FIG. 15.

The demux switching circuit 15 shown in FIG. 15 includes first demux switches S11 and S31, and second demux switches S12 and S32, which are connected to output channels CH1 and CH3 of the data driving circuit, respectively. The demux switching circuit 15 divides a signal received from the output channels CH1 and CH3 of the data driving circuit using a 1 to 2 demultiplexing method and outputs the divided signals to data lines D1, D3, D4, and D6.

Because the 1 to 2 demultiplexing is applied to pixels displaying two of three colors and the demultiplexing is not applied to pixels displaying the one remaining color, pixels displaying the same color correspond to only one of the first and second demux switches of the demux switching circuit 15 as shown in FIG. 15. For example, first pixels displaying a first color (B) are connected to the output channels CH1 and CH3 of the data driving circuit through the first demux switches S11 and S31, and second pixels displaying a second color (R) are connected to the output channels CH1 and CH3 of the data driving circuit through the second demux switches S12 and S32. Further, third pixels displaying a third color (G) are directly connected to remaining output channels CH2 and CH4. but not to the output channels CH1 and CH3, of the data driving circuit.

Accordingly, regardless of how the first and second demux control signals DMUX1 and DMUX2 are generated, for example as shown in FIG. 16, pixels displaying the same color are connected to the data driving circuit using the same method. Therefore, the pixels displaying the same color are influenced by the kickback voltage the same number of times. Hence, the current deviation between the pixels displaying the same color is not generated. The current deviation between pixels displaying different colors may be generated, but is not plainly visible as a longitudinal dim.

The output channels CH1 and CH3, and the remaining output channels CH2 and CH4 of the data driving circuit may be alternately disposed. Namely, the output channels CH1 and CH3 of the data driving circuit may be selected as odd-numbered output channels, and the remaining output channels CH2 and CH4 of the data driving circuit may be selected as even-numbered output channels.

As shown in FIG. 16, an initialization period P1 for initializing the first to third pixels, a sensing period P2 for sensing threshold voltages of driving elements included in the first to third pixels, and a programming period P3 for applying the data voltage to the first to third pixels are sequentially assigned so as to drive the pixels disposed on one horizontal pixel line. Further, the first demux control signal DMUX1 is held at an on-level Lon during a portion of the programming period P3 and then falls to an off-level Loff. The first demux control signal DMUX1 is held at the off-level Loff during a remaining period of the programming period P3. The second demux control signal DMUX2 is held at the off-level Loff during a portion of the programming period P3 and then rises to the on-level Lon. The second demux control signal DMUX2 is held at the on-level Lon during a remaining period of the programming period P3.

The data driving circuit may further generate the reference voltage Vref in the initialization period P1 and the sensing period P2 and may supply the reference voltage Vref to the demux switching circuit 15. For this, the first and second demux switches S11, S31, S12, and S32 may be simultaneously turned on in response to the first and second demux control signals DMUX1 and DMUX2, which are synchronized with each other at the on-level Lon in the initialization period P1 and the sensing period P2, and thus may supply the reference voltage Vref to the data lines D1, D3, D4, and D6.

As described above, embodiments of the invention provide the demux switching circuit and the demux switching control signals so that the pixels displaying the same color are influenced by the kickback voltage the same number of times in the demux driving method, thereby preventing the generation of the unwanted current deviation between the pixels of the same color. In some examples, even pixels displaying different colors are influenced by the kickback voltage the same number of times so that the current deviation between the pixels of different colors is also prevented.

It will be apparent to those skilled in the art that various modifications and variations can be made in the organic light emitting display of the present invention without departing from the spirit or scope of the invention. Thus, it is intended that the present invention cover the modifications and variations of this invention provided they come within the scope of the appended claims and their equivalents.

What is claimed is:

1. A display device, comprising:
a display panel including a plurality of data lines, a plurality of gate lines, and a plurality of pixels coupled to the data lines and gate lines, wherein the data lines include first data lines and second data lines, and the pixels include first color pixels and second color pixels;
a data driving circuit to generate data voltages through a plurality of output channels;
a gate driving circuit coupled to the gate lines;
a timing controller to generate control signals to the data driving circuit and the gate driving circuit; and
a demultiplexer (demux) switching circuit including:
a plurality of first demux switches coupled to the output channels and to the first data lines to supply, when turned on, the data voltages from the output channels to the first data lines; and
a plurality of second demux switches coupled to the output channels and to the second data lines to supply, when turned on, the data voltages from the output channels to the second data lines;
wherein at least one of the first color pixels and at least one of the second color pixels are each coupled to one of the gate lines and to a respective one of the first data lines, and
wherein another of the first color pixels and another of the second color pixels are each coupled to the one gate line and to a respective one of the second data lines.

2. The display device of claim 1, wherein
the pixels include third color pixels,
at least one of the third color pixels is coupled to the one gate line and to another one of the first data lines, and
another one of the third color pixels is coupled to the one gate line and to another one of the second data lines.

3. The display device of claim 1, further comprising:
a control signal generator coupled to the timing controller to receive a control signal from the timing controller, and to generate a first demux control signal to turn on the first demux switches and a second demux control signal to turn on the second demux switches.

4. The display device of claim 3, wherein the control signal generator is configured to generate the first demux control signal and the second demux control signal sequentially so as to turn on the first demux switches at a different time from the second demux switches.

5. The display device of claim 3, wherein the demux switching circuit further includes:
first auxiliary switches, each coupled in parallel with a respective one of the first demux switches, to supply a reference voltage from the output channels to the first data lines, and
second auxiliary switches, each coupled in parallel with a respective one of the second demux switches, to supply the reference voltage from the output channels to the second data lines,
wherein the control signal generator is configured to generate an auxiliary control signal to turn on the first and second auxiliary switches.

6. The display device of claim 5, wherein
the auxiliary control signal is configured to turn on the first and second auxiliary switches to supply the reference voltage from the output channels to the first and second data lines while the first and second demux switches are turned off, and
the first and second auxiliary switches are configured to be turned off while the first demux switches or the second demux switches are turned on.

7. The display device of claim 1, wherein the display device is an organic luminescence emitting diode (OLED) display.

8. The display device of claim 7, wherein each pixel includes:
- a driving thin film transistor (TFT) coupled to a first node and a second node;
- a first switching TFT coupled to the first node and to one of the data lines;
- a second switching TFT coupled to the second node and to an initialization voltage line;
- a third switching TFT coupled to the driving TFT and to a high potential cell driving voltage line;
- a first capacitor coupled between the first node and the second node;
- a second capacitor coupled to the second node and to the initialization voltage line; and
- an OLED coupled to the second node and to a low potential cell driving voltage line.

9. The display device of claim 8, wherein the one gate line includes:
- a first scan line coupled to and the first switching TFT to control the first switching TFT;
- a second scan line coupled to the second switching TFT to control the second switching TFT; and
- an emission line coupled to the third switching TFT to control the third switching TFT.

10. The display device of claim 1, wherein the first color pixels have a color different from the second color pixels.

11. A display device, comprising:
- a display panel including a plurality of data lines, a plurality of gate lines, and a plurality of pixels coupled to the data lines and gate lines, wherein the pixels include first, second, and third color pixels, and the data lines include first data lines coupled to the first color pixels, second data lines coupled to the second color pixels, and third data lines coupled to the third color pixels;
- a data driving circuit to generate data voltages through a plurality of output channels;
- a gate driving circuit coupled to the gate lines;
- a timing controller to generate control signals to the data driving circuit and the gate driving circuit; and
- a demultiplexer (demux) switching circuit including:
  - a plurality of first demux switches coupled to the output channels and to the first data lines to supply, when turned on, the data voltages from the output channels to the first data lines;
  - a plurality of second demux switches coupled to the output channels and to the second data lines to supply, when turned on, the data voltages from the output channels to the second data lines;
  - a plurality of third demux switches coupled to the output channels and to the third data lines to supply, when turned on, the data voltage from the output channels to the third data lines;
  - first auxiliary switches, each coupled in parallel with a respective one of the first demux switches, to supply a reference voltage from the output channels to the first data lines;
  - second auxiliary switches, each coupled in parallel with a respective one of the second demux switches, to supply the reference voltage from the output channels to the second data lines; and
  - third auxiliary switches, each coupled in parallel with a respective one of the third demux switches, to supply the reference voltage from the output channels to the third data lines; and
- a control signal generator coupled to the timing controller to receive a control signal from the timing controller, and to generate a first demux control signal to turn on the first demux switches, a second demux control signal to turn on the second demux switches, a third demux control signal to turn on the third demux switches, and an auxiliary control signal to turn on the first, second, and third auxiliary switches.

12. The display device of claim 11, wherein
- the pixels further include fourth color pixels;
- the data lines further include fourth data lines coupled to the fourth color pixels; and
- the demux switching circuit further included a plurality of fourth demux switches coupled to the output channels and to the fourth data lines to supply, when turned on, the data voltages from the output channels to the fourth data lines.

13. The display device of claim 11, wherein the timing controller is configured to generate a first demux control signal to turn on the first demux switches, a second demux control signal to turn on the second demux switches, and a third demux control signal to turn on the third demux switches.

14. The display device of claim 11, wherein the control signal generator is configured to generate the first demux control signal, the second demux control signal, and the third demux control signal sequentially so as to turn on the first, second, and third demux switches at a different time from one another.

15. The display device of claim 11, wherein
- the auxiliary control signal is configured to turn on the first, second, and third auxiliary switches to supply the reference voltage from the output channels to the first, second, and third data lines while the first, second, and third demux switches are turned off, and
- the first, second, and third auxiliary switches are configured to be turned off while the first, second, or third demux switches are turned on.

16. The display device of claim 11, wherein the display device is an organic luminescence emitting diode (OLED) display.

17. A display device, comprising:
- a display panel including a plurality of data lines, a plurality of gate lines, and a plurality of pixels coupled to and defined by the data lines and gate lines, wherein the pixels include first, second, and third color pixels, and the data lines include first data lines coupled to the first color pixels, second data lines coupled to the second color pixels, and third data lines coupled to the third color pixels;
- a data driving circuit to generate data voltages through a plurality of output channels, the output channels including first output channels and second output channels;
- a gate driving circuit coupled to the gate lines;
- a timing controller to generate control signals to the data driving circuit and the gate driving circuit; and
- a demultiplexer (demux) switching circuit coupled between the output channels and the data lines, and including:
  - a plurality of first demux switches coupled to the first output channels and to the first data lines to supply, when turned on, the data voltages from the first output channels to the first data lines;

a plurality of lines coupled to the second output channels and to the second data lines to supply the data voltages from the second output channels directly to the second data lines without a use of a demux switch; and a plurality of second demux switches coupled to the first output channels and to the third data lines to supply, when turned on, the data voltages from the first output channels to the third data lines.

18. The display device of claim 17, wherein the timing controller is configured to generate a first demux control signal to turn on the first demux switches and a second demux control signal to turn on the second demux switches.

19. The display device of claim 17, further comprising:
a control signal generator coupled to the timing controller to receive a control signal from the timing controller, and to generate a first demux control signal to turn on the first demux switches and a second demux control signal to turn on the second demux switches.

20. The display device of claim 19, wherein the control signal generator is configured to generate the first demux control signal and the second demux control signal sequentially so as to turn on the first demux switches at a different time from the second demux switches.

21. The display device of claim 19, wherein the demux switching circuit further includes:
first auxiliary switches, each coupled in parallel with a respective one of the first demux switches, to supply a reference voltage from the first output channels to the first data lines, and
second auxiliary switches, each coupled in parallel with a respective one of the second demux switches, to supply the reference voltage from the first output channels to the third data lines,
wherein the control signal generator is configured to generate an auxiliary control signal to turn on the first and second auxiliary switches.

22. The display device of claim 21, wherein
the auxiliary control signal is configured to turn on the first and second auxiliary switches to supply the reference voltage from the first output channels to the first and third data lines while the first and second demux switches are turned off, and
the first and second auxiliary switches are configured to be turned off while the first demux switches or the second demux switches are turned on.

23. The display device of claim 17, wherein the display device is an organic luminescence emitting diode (OLED) display.

24. A display device, comprising:
a display panel including a plurality of data lines, a plurality of gate lines, and a plurality of pixels coupled to the data lines and gate lines, wherein the data lines include first data lines and second data lines, and the pixels include first color pixels and second color pixels such that one of the first data lines and one of the second data lines are coupled to respective ones of the first color pixels coupled to one of the gate lines, and another of the first data lines and another of the second data lines are coupled to respective ones of the second color pixels coupled to the one gate line;
a data driving circuit to generate data voltages through a plurality of output channels;
a gate driving circuit to supply scan signals to the gate lines;
a demultiplexer (demux) switching circuit including
a plurality of first demux switches coupled to the output channels and to the first data lines to supply, when turned on, the data voltages from the output channels to the first data lines, and
a plurality of second demux switches coupled to the output channels and to the second data lines to supply, when turned on, the data voltages from the output channels to the second data lines; and
a timing controller to generate control signals to the data driving circuit, the gate driving circuit, and the demux switching circuit, the control signals including a first demux control signal to turn on the first demux switches and a second control signal to turn on the second demux switches,
wherein the timing controller is configured to turn the first demux control signal on and then off, and then turn the second demux control signal on and then off, during a period in which one of the scan signals supplied to the one gate line is turned on.

25. The display device of claim 24, wherein the gate driving circuit is configured to turn on the one scan signal prior to the first demux control signal is turned on and to turn off the one scan signal after the second demux control signal is turned off.

26. The display device of claim 24, wherein the display device is an organic luminescence emitting diode (OLED) display.

27. The display device of claim 24, wherein the first color pixels have a color different from the second color pixels.

28. A display device, comprising:
a display panel including a plurality of data lines, a plurality of gate lines, and a plurality of pixels coupled to the data lines and gate lines, wherein the data lines include first data lines and second data lines, and the pixels include first color pixels and second color pixels such that one of the first data lines and one of the second data lines are coupled to respective ones of the first color pixels coupled to one of the gate lines and nearest to each other, and another of the first data lines and another of the second data lines are coupled to respective ones of the second color pixels coupled to the one gate line and nearest to each other;
a data driving circuit to generate data voltages through a plurality of output channels;
a gate driving circuit to supply scan signals to the gate lines;
a demultiplexer (demux) switching circuit including
a plurality of first demux switches coupled to the output channels and to the first data lines to supply, when turned on, the data voltages from the output channels to the first data lines, and
a plurality of second demux switches coupled to the output channels and to the second data lines to supply, when turned on, the data voltages from the output channels to the second data lines; and
a timing controller to generate control signals to the data driving circuit, the gate driving circuit, and the demux switching circuit, wherein the timing controller is configured to supply a first demux control signal to the first demux switches and a second control signal to the second demux switches so that, during a predetermined period, a kickback voltage is applied a same number of times to the respective ones of the first color pixels.

29. The display device of claim 28, wherein the kickback voltage is applied the same number of times to the respective ones of the second color pixels.

30. The display device of claim 28, wherein the display device is an organic luminescence emitting diode (OLED) display.

31. The display device of claim 28, wherein the first color pixels have a color different from the second color pixels.

* * * * *